United States Patent
Cox et al.

(10) Patent No.: US 8,639,889 B2
(45) Date of Patent: Jan. 28, 2014

(54) ADDRESS-BASED HAZARD RESOLUTION FOR MANAGING READ/WRITE OPERATIONS IN A MEMORY CACHE

(75) Inventors: Jason A. Cox, Raleigh, NC (US); Robert J. Dorsey, Durham, NC (US); Kevin C K Lin, Raleigh, NC (US); Eric F. Robinson, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 300 days.

(21) Appl. No.: 13/017,250

(22) Filed: Jan. 31, 2011

(65) Prior Publication Data
US 2012/0198178 A1     Aug. 2, 2012

(51) Int. Cl.
*G06F 12/00* (2006.01)
(52) U.S. Cl.
USPC ............................ 711/145; 711/154; 711/156
(58) Field of Classification Search
USPC .......................................... 711/145, 154, 156
See application file for complete search history.

(56) References Cited

U.S. PATENT DOCUMENTS

| | | | |
|---|---|---|---|
| 6,212,623 B1 | 4/2001 | Witt | |
| 6,308,259 B1 | 10/2001 | Witt | |
| 7,240,277 B2 * | 7/2007 | Anderson et al. | ............. 714/805 |
| 7,734,899 B2 | 6/2010 | Crook et al. | |
| 2008/0288752 A1 | 11/2008 | Cox et al. | |
| 2009/0157943 A1 | 6/2009 | Robinson | |
| 2009/0157944 A1 | 6/2009 | Robinson | |
| 2010/0145969 A1 | 6/2010 | Wang et al. | |
| 2010/0268884 A1 | 10/2010 | Cummings et al. | |
| 2010/0268984 A1 | 10/2010 | Guthrie et al. | |

FOREIGN PATENT DOCUMENTS

WO      WO0011548 A1      3/2000

* cited by examiner

*Primary Examiner* — Reba I Elmore
(74) *Attorney, Agent, or Firm* — H. Daniel Schnurmann; Jeffrey L. Streets

(57) ABSTRACT

One embodiment provides a cached memory system including a memory cache and a plurality of read-claim (RC) machines configured for performing read and write operations dispatched from a processor. According to control logic provided with the cached memory system, a hazard is detected between first and second read or write operations being handled by first and second RC machines. The second RC machine is suspended and a subset of the address bits of the second operation at specific bit positions are recorded. The subset of address bits of the first operation at the specific bit positions are broadcast in response to the first operation being completed. The second operation is then re-requested.

20 Claims, 6 Drawing Sheets

ADDRESS-BASED HAZARD RESOLUTION FOR MANAGING READ/WRITE OPERATIONS IN A MEMORY CACHE

BACKGROUND

1. Field of the Invention

The present invention relates to handling read and write operations and associated hazards within a memory cache.

2. Background of the Related Art

A memory cache (alternately referred to as "cache") is a computer system component for temporarily storing a selected portion of instructions and/or data from a primary storage device, such as main memory (RAM) or a hard disk drive. For example, nearly every modern microprocessor employs a Level 1 (L1) and Level 2 (L2) cache for storing data and instructions from main memory for access by the processor. A memory cache has less storage capacity, but may be accessed more quickly than the storage device whose memory is being cached. A memory cache is therefore used to store the portion of data and instructions from the storage device that is most likely to be accessed, such as the most relevant or frequently accessed data, to reduce the amount of time spent accessing main memory. L1 cache can be built directly into the processor and can run at the same speed as the processor, providing the fastest possible access time. L2 cache is also used to store a portion of main memory and may be included within a chip package, but is usually separate from the processor. L2 cache is slower than L1 cache, but typically has a greater storage capacity than L1 cache and is still much faster than main memory.

L1 cache typically includes an instruction cache and a data cache. An L1 instruction cache contains a copy of a portion of the instructions in main memory. An L1 data cache contains a copy of a portion of data in main memory, but some designs allow the data cache to contain a version of the data that is newer than the data in main memory. This is referred to as a store-in or write-back cache because the newest copy of the data is stored in the data cache and because it must be written back out to memory when that cache location is needed to hold a different piece of data. An L2 cache typically contains both instruction and data.

Some systems having multiple processors (or processor cores) include a separate L1 cache for each processor, but share a common L2 cache. This is referred to as a shared L2 cache. Because such an L2 cache may have to handle several read and/or write operations simultaneously from multiple processors and even from multiple threads within the same physical processor, a shared L2 cache is usually more complex than an L2 cache dedicated to a single processor. A shared L2 cache typically has a number of Read-claim (RC) machines to handle the read/write operations that originate from the multiple processors and threads. The RC machines are often responsible for doing such things as searching the L2 cache, returning data/instructions for the sought after address, updating the L2 cache, and requesting data from memory or from the next level of cache if the sought after address does not exist in the L2 cache.

The memory cache used with main memory may be mapped to the main memory in a variety of ways. Examples of cache mapping known in the art include direct-mapped cache, fully associative cache, and N-way set-associative cache. Direct mapping involves dividing main memory according to the number of cache lines provided, so that each division of main memory shares a particular cache line. At the other end of the spectrum, fully associative cache allows any cache line to store the contents of any memory location in main memory. N-way set-associative cache involves a compromise between direct mapping and fully-associative mapping, wherein the cache is divided up into multiple "sets," each set containing some number of cache lines (alternately referred to as "ways"). Typically, set-associative cache structures contain 2, 4 or 8 ways per set. Each memory address is placed into one and only one set, but can be held in any one of the ways within that set. The collection of memory addresses that can be placed into any one set is called a congruence class.

A "hazard" occurs when two different RC machines seek to make potentially conflicting changes to a cache. When a hazard is detected, the RC seeking to perform a read or write request must wait for the conflicting RC to complete the read or write request it is currently performing, to prevent errors. Hazards include architectural hazards caused by architectural constraints and design implementation hazards caused by design constraints. For example, one architectural constraint may be a read-after-write requirement, which leads to an architectural hazard because an RC machine handling the read request must wait for the RC machine handling the write request. One example of a design constraint is congruence class matching, which is intended to ensure that at most one RC machine will be active at a time for each congruence class. For example, tracking of which cache way (within the set assigned to that congruence class) is to be replaced when a new line is brought in from memory is simplified because the Least Recently Used (LRU) array which holds that information can be read once knowing it will not be updated by another RC in midstream. A design hazard thus results when two RC machines seek to operate on the same congruence class simultaneously. For a particular architecture and L2 cache implementation, any number of different hazards may be possible and multiple hazards may exist simultaneously. When a hazard is detected between a read or write operation currently being performed and a requested read or write operation, the requested read or write operation is rejected and the RC machine handling the requested read or write operation must re-request the read or write operation at a later time.

A number of methods have been proposed in the art for generating re-requests for rejected RC machines. A first example method known in the art is for rejected RC machines to re-request immediately. This approach is fairly simple, and the micro-circuitry required to implement this method requires very little silicon area on the substrate on which the circuitry is implemented. However, each request consumes power, and this method results in rapid requests from all suspended RC machines, leading to increased power consumption. Also, the high rate of re-requests from suspended RC machines delays requests from other RC machines that would have been accepted, causing relatively poor performance.

A second example method known in the art is to blindly re-request at fixed or random time intervals to reduce the frequency of retry requests. The circuitry required to implement this method occupies a greater silicon area and consumes more power than in the first method, without increasing the certainty that a particular hazard may be cleared at the time of re-request. Thus, this second method still has relatively poor performance because re-requests may happen too soon or wait too long after the hazard clears.

A third example method known in the art is for each RC machine to signal when it goes idle. The logical OR of these signals is used by all suspended RC machines as the indication to re-request. This method also requires very little silicon area and reduces the frequency of retry requests relative to the first method. However, because all suspended RC machines re-request whenever any RC machine goes idle, there are still frequent requests, causing relatively high power consumption and low performance. Note that because all suspended RC machines re-request as soon as any RC machine goes idle, in a heavily utilized system with lots of RC machines, there stands a good chance that the conflicting RC machine is still active; hence, the re-requesting RC will be rejected again.

A fourth example method known in the art is to return a unique RC identifier (ID) of the conflicting RC machine to the requesting RC machine. The requesting RC machine is suspended and holds this ID. When each active RC machine goes idle, it broadcasts its identifier and all suspended RC machines compare against this to determine when to re-request. This method generates precise re-requests for a particular hazard. However holding and comparing the hazard's machine ID in each RC machine requires a relatively large silicon area that increases with an increasing number of RC machines. Also, because only one hazard ID is held, if one or more additional hazards exist, the re-request may be imprecise. Additionally, this approach may result in a "window" condition wherein the rejected RC is suspended around the time that the conflicting RC machine goes IDLE, causing the suspended RC machine to "miss" the ID broadcast of the conflicting RC machine. Additional complexity is required to close this window condition.

A fifth example method known in the art that precisely handles multiple hazards is to generate a full ID-based dependency vector, wherein one bit per RC machine is saved by each requesting RC machine to indicate whether a hazard exists or not. Multiple hazards from multiple RC machines can be saved in this method. Each active RC that goes idle clears its assigned bit in the dependency vector of all suspended RC machines. When a dependency vector of a suspended RC machine is cleared, that RC machine can re-request. This results in a precise re-request for multiple hazards, at the expense of a relatively large silicon area that increases exponentially with increasing number of RC machines.

BRIEF SUMMARY

One embodiment of the present invention provides a method, wherein read and write operations are dynamically dispatched in a memory cache. A hazard is detected between a requested read or write operation and a read or write operation actively being performed for a specified memory address. In response to detecting the hazard, the performance of the requested read or write operation is suspended. In response to each completed read or write operation, a representation of a subset of address bits at specific bit positions of the completed read or write operation is broadcast. Any suspended read or write operation for which the subset of address bits equals the broadcast subset of address bits is automatically re-requested. The method may be implemented by a computer using computer usable program code embodied on a computer usable storage medium.

Another embodiment of the invention provides a cached memory system including a memory cache for dynamically storing data and instructions addressed to main memory. A plurality of read-claim (RC) machines are configured for performing read and write operations originating from a processor. Control logic is provided for detecting a hazard between a first read or write operation actively being performed by a first RC machine and a second read or write operation being requested by a second RC machine. Control logic is also provided for suspending the second RC machine in response to detection of the hazard. Control logic is provided for broadcasting a representation of a subset of address bits of the first read or write operation at the specific bit positions in response to completion of the first read or write operation. Control logic is also provided for automatically re-requesting the second read or write operation in response to detecting the subset of address bits of the second read or write operation equal the broadcast representation of the subset of address bits of the first read or write operation.

DETAILED DESCRIPTION

Figure 1:
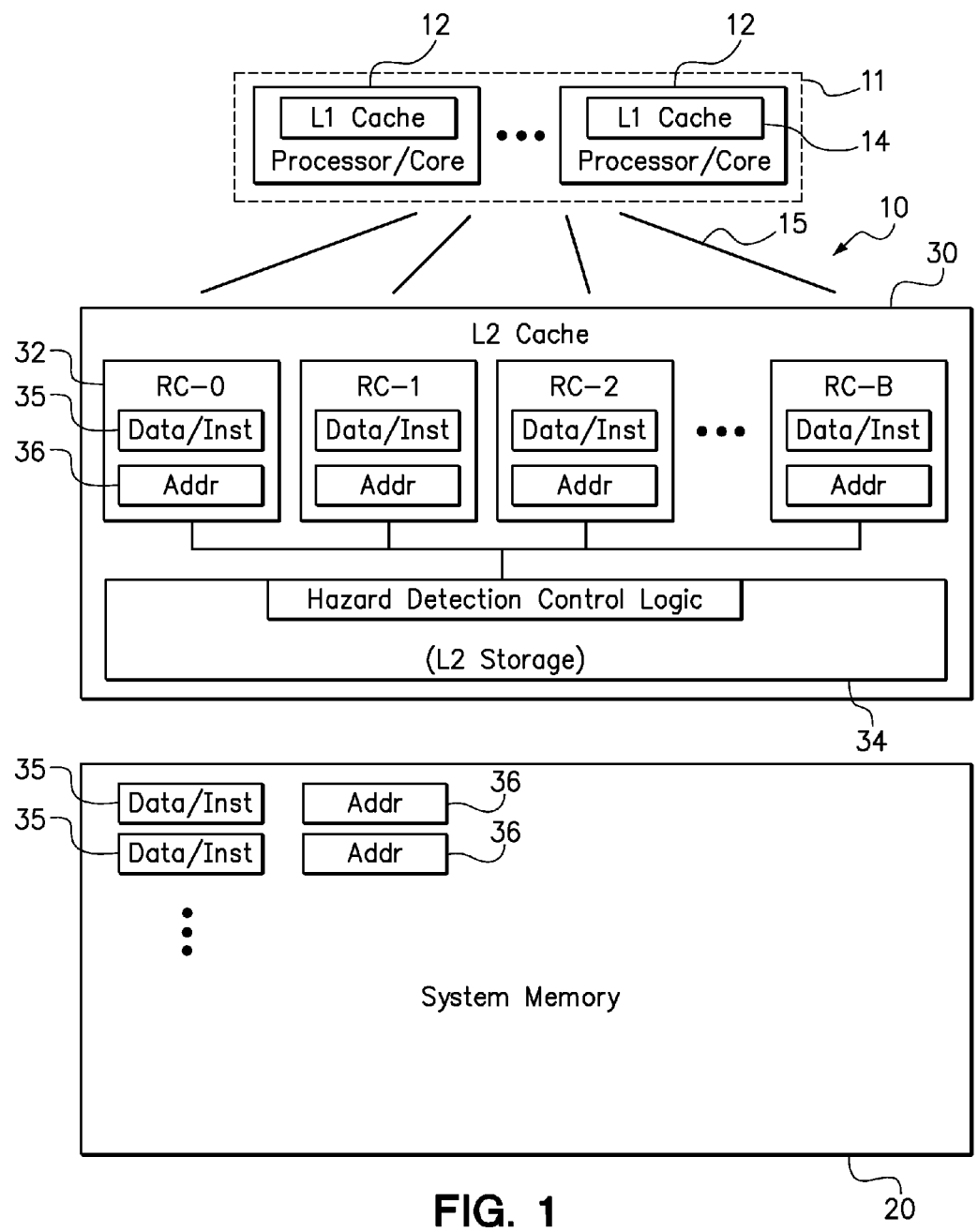
FIG. 1 is a schematic diagram of a cached memory system according to an embodiment of the invention.

Embodiments of the invention include a system and method for managing read and write operations in a memory cache. The circuitry used to implement the disclosed embodiments may occupy a relatively small amount of silicon area and have a low power consumption, with a re-request time that still allows for good performance. In one embodiment, read and write operations are dynamically dispatched to a plurality of read-claim (RC) machines in a cached memory system. The RC machines are tasked with handling the dispatched read and write operations. Each operation being handled by an RC machine relates to a specific memory address. If a hazard exists between a first operation being performed by a first, active RC machine and a second, pending operation to be performed by a second RC machine, the operation being handled by the second RC machine is suspended (the RC machine handling the suspended operation may be referred to as the suspended RC machine). A selected subset of the address bits of operations completed by other RC machines are broadcast and compared to the subset of address bits of the suspended operation at the same bit positions. If the values of a broadcast subset of address bits match the subset of address bits of the suspended operation, the suspended RC machine re-requests the suspended operation. In response to the re-request, a hazard check may again be performed. If no hazard is detected for the re-requested operation, the operation associated with the re-request is performed.

To facilitate comparison of the subset of address bits, each RC machine optionally will encode its subsets of address bits in the form of a hazard resolution vector, such as a four-bit, one-hot hazard resolution vector. When an active RC machine completes an operation, that RC machine then broadcasts a hazard resolution vector representing its subset of address bits. If one of the broadcast hazard resolution vectors equals the hazard resolution vector of a suspended RC machine, then the suspended RC machine re-requests the operation it is handling. If no other hazard is present at the time of re-request, then the re-requesting RC machine is allowed to go active to perform the re-requested operation. Multiple vectors representing different subsets of address bits may be broadcast simultaneously, because multiple RC machines can complete their respective operations at the same instant or clock cycle. Each suspended RC machine is only waiting for a subset of address bits or hazard resolution vector of a specific value in order to initiate a re-request.

The particular address bits and number of address bits that are used to control the dependency may be configurable, either by a user in a user-configurable embodiment or by the computer system in a dynamically-configurable embodiment. The ability to select and change the particular address bits and number of address bits used to control the dependency allows the user or system to tune the re-request settings to the desired performance level for a given workload. For example, a system and method according to an embodiment of the invention allows for throttling suspended RC re-request rates. A workload may be monitored, and the subset of bits may be dynamically selected as a function of the workload to perform the desired level of throttling.

FIG. 1 is a schematic diagram of a cached memory system 10 according to an embodiment of the invention. The cached memory system 10 includes main memory 20 and a processor section 11 for retrieving, processing, and storing data and software instructions in main memory 20. Main memory comprises random access memory (RAM), which may be embodied as one or more dual in-line memory module (DIMM) having a plurality of dynamic random access memory (DRAM) chips. The processor section 11 is a multi-processor configuration having a plurality of processors (CPUs) 12, although the invention may alternatively be embodied as a single-processor configuration. The processors 12 may be separate CPUs mounted on a system board or processor cores of a multi-core processor combined into a single integrated circuit die or "chip." Simultaneous multi-threading (SMT) may be implemented on the processors 12 to handle multiple independent threads of execution, to better utilize the resources provided by modern processor architectures. Multiple concurrent read and write operations may be generated by multiple processes being performed by the plurality of processors 12 in a multi-processor system. Multiple concurrent read and write operations may also be generated by multiple threads of execution being handled within a single processor 12. A read operation is a load-type access for reading data or instructions 35 at one or more specific memory address 36 in main memory 20. A write operation is a store-type access for writing data or instructions 35 to one or more specific memory address.

Multiple levels of memory cache are provided to store frequently used portions of data and instructions 36 from main memory 20, to increase the efficiency of read and write operations. The multiple levels of memory cache include, by way of example, a separate Level 1 (L1) cache 14 on each processor 12 and a Level 2 (L2) cache 30 shared among the processors 12. Although the illustrated cache hierarchy includes two levels of cache, one skilled in the art will appreciate that additional levels of on-chip, off-chip, or look-aside cache may also be included. When one of the processors 12 attempts to access instruction or data from main memory 20, the processor 12 is first directed to its local L1 cache 14. If the memory address of the instructions or data sought does not exist in its local L1 cache 14 at that moment, the processor 12 is next directed to the shared L2 cache 30. If the instructions or data sought are not in L1 cache 14 or the shared L2 cache 30, the processor 12 will then obtain the instructions or data directly from the main memory 20. Control logic is included with the caches 14, 30 themselves to manage the movement and storage of data and instructions. Thus, the processor 14 does not need to know whether the data and instructions are actually being retrieved from and stored directly to the main memory 20, or instead from the L1 cache 14 or L2 cache 30.

When processing data and instructions, a given processor 12 will generate various read and write operations 15 addressed to specific addresses in main memory 20. The shared L2 cache 30 dispatches the read and write operations 15 to any of a plurality of RC machines 32, which handle the read and write operations 15. The RC machines 32 may include circuits and/or control logic embodied within the L2 cache 30. In this example, twelve RC machines 32 labeled from RC-0 to RC-B are provided to handle the read and write operations 15, although one skilled in the art will appreciate that a different number of RC machines 32 may be provided. The hexadecimal numerals "0" to "B" are used to number the RC machines 32. Hexadecimal notation provides an alternative way to express alphanumeric values requiring fewer digits than the binary expressions handled by computers. Hexadecimal notation includes sixteen digits, from 0-9 and A-F. According to the convention used herein, a hexadecimal expression begins with "0x," and a binary expression begins with "0b." For example, 0b0001=0x1, 0b0010=0x2, 0b0011=0x3, 0b0100=0x4, and 0b0101=0x5. This hexadecimal notation is also selectively used in the subsequent figures, such as to provide more concise, hexadecimal equivalents for 16-bit binary memory addresses.

Referring still to FIG. 1, each operation dispatched to an RC machine 32 from the shared L2 cache 30 specifies a memory address 36 that exists in main memory 20. A write operation will include data or instructions 35 to be written at the associated memory address 36 and a read operation will seek to retrieve data or instructions 35 associated with the memory address 36. The data or instructions 35 to be read or written are addressed to particular memory locations and may be directly written to or read from main memory 20, read from or written to the L2 cache 30, or read from or written to another, lower-level cache. In handling the read and write operations 15, the RC machines 32 are responsible for such tasks as searching an L2 storage portion 34 of the L2 cache 30, returning any data and instructions 35 associated with the memory address 36 if the data and instructions 35 are found in the L2 cache 30, updating the L2 cache 30, and requesting data from main memory 20 or from a next level of cache (e.g. an L3 cache, not shown) if the data and instructions sought are not found in the L2 cache 30.

The RC machines 32 are provided with control logic for identifying hazards between any two (first and second) of the RC machines 32, to avoid errors that may otherwise result therefrom. As used herein, an "active" RC machine refers to an RC machine 32 actively performing a read or write operation. After an RC machine 32 receives a read or write operation from a processor 12, that RC machine 32 requests to "go active." In response to an RC machine 32 requesting to go active, hazard detection control logic 38 is applied to detect if any hazard exists between the requested read or write operation and any other read or write operations currently being performed by an active RC machine 32. If no hazard is detected, the RC machine 32 commences the requested read or write operation. If a hazard is detected, the request to go active is instead rejected, and the requesting RC machine 32 is "suspended." The suspended RC machine 32 must re-request to go active at some later time. If any hazard remains when a suspended RC machine re-requests to go active, the re-request will be rejected and the RC machine will remain suspended and all future re-requests will continue to be rejected until all hazards are resolved. Once all hazards are resolved, the re-request will be granted, and the RC machine will then go active.

Figure 2:
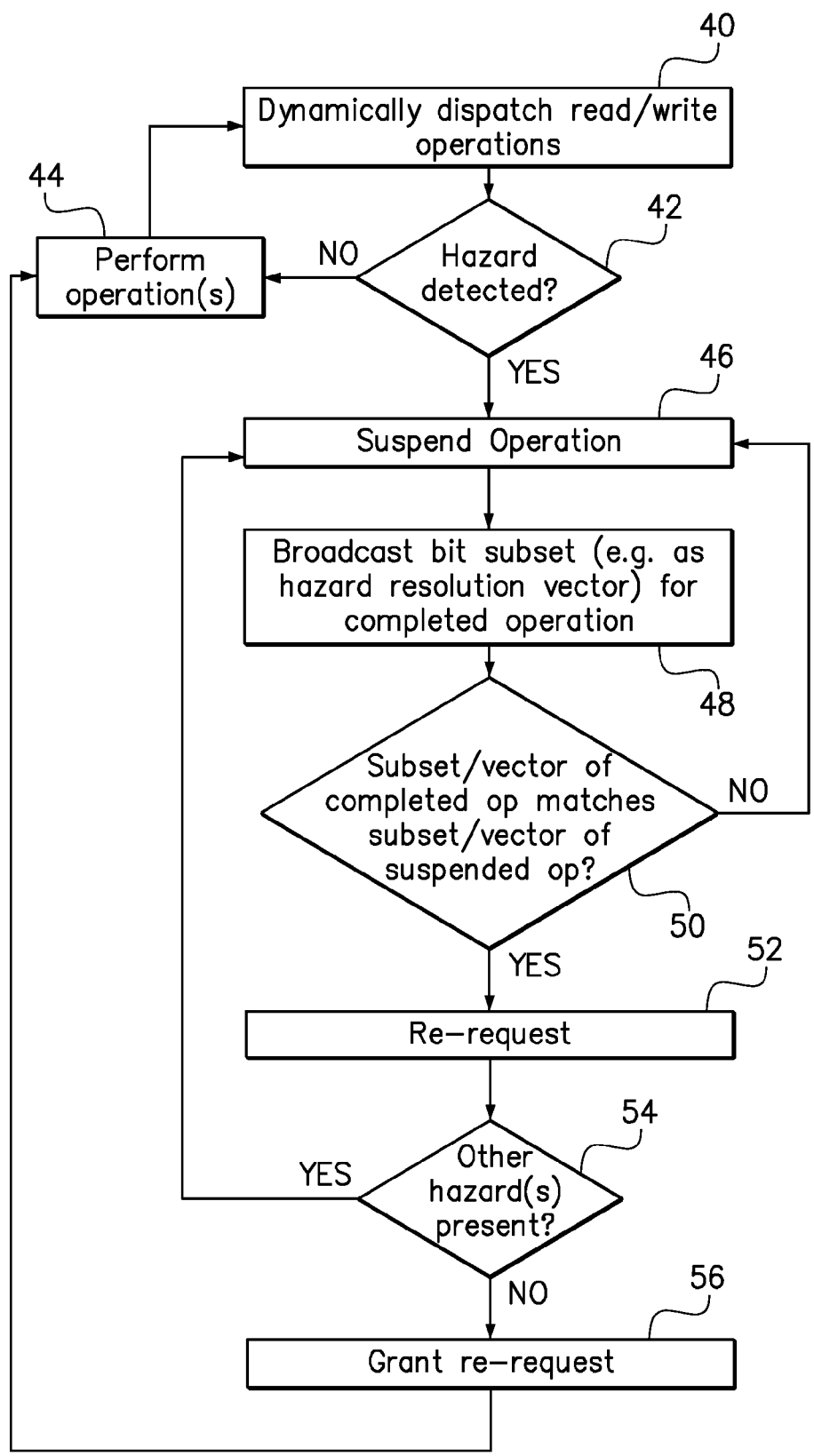
FIG. 2 is a flowchart illustrating a method of managing requests for read and write operations in a cached memory system, such as the cached memory system of FIG. 1.

FIG. 2 is a flowchart illustrating a method of managing requests for read and write operations in a cached memory system, such as the cached memory system of FIG. 1, according to an embodiment of the invention. According to step 40, read and write operations are dynamically dispatched to a plurality of read-claim (RC) machines. As other steps are being handled, read and write operations may continue to be dispatched from a cache, having originated from one or more processors. According to conditional step 42, a hazard is detected between first and second operations being handled by respective first and second RC machines. A hazard may exist between any two RC machines at any given clock cycle. A particular hazard may result, for example, from the second RC machine requesting to go active with a second read or write operation when the first RC machine is already actively performing a first read or write operation. Detecting the hazard may include applying hazard detection control logic to compare the addresses of the associated read/write operations being handled by the first and second RC machines. For example, a read-after-write hazard may be detected by comparing the addresses to determine whether the second RC machine is trying to read from a memory address currently being written to by the first RC machine. Alternatively, a congruence class hazard may be detected by comparing address bits that defines the congruence class. In one embodiment, for example, the last 8 bits of a 16-bit address may define its congruence class. The particular bits defining the congruence class depends on the particular embodiment; in the present example, whether the congruence class is 8 bits is dependent upon the cache configuration and has no direct relationship to the number of address bits. If no hazard is detected for a requested operation, the requested operation may be performed according to step 44. An operation dispatched from a processor may alternatively be queued for later performance, and hazard detection (step 42) may be applied prior to performing each queued operation. If a hazard is detected between the first and second RC machines in conditional step 42, the second operation may be suspended according to step 46.

Each RC machine having completed an operation goes idle unless and until another operation is dispatched to that RC machine (either directly from a processor or from a queue). When any RC machine completes an operation, that RC machine broadcasts a representation of the subset of a predefined selection of address bits for that operation according to step 48. Multiple RC machines can complete at same instant or clock cycle, and thus multiple subsets of address bits (e.g. multiple vectors) can be broadcast simultaneously. The subset of address bits that are broadcast are optionally encoded and broadcast in the form of a hazard resolution vector or other representation of those bits. The hazard resolution vector may be multi-bit, one-hot, such as a four-bit, one-hot hazard resolution vector. The hazard resolution vector may be generated on-the-fly. That is, the first hazard resolution vector may be generated immediately prior to broadcasting the hazard resolution vector, without storing the first hazard resolution vector. Storing the hazard resolution vector is optional, such as for diagnostic purposes.

In conditional step 50, the subset of address bits broadcast in step 48 are compared to the subset of address bits of the operation suspended in step 46. The comparison may be performed by comparing the hazard resolution vector formed for the completed operation with a hazard resolution vector formed for the suspended operation. A dependency table is discussed below with reference to FIGS. 3-6 to assist in visualizing current hazards in a cached memory system, but is not required to be stored in the system 10 of FIG. 1. If the broadcast hazard resolution vector matches the hazard resolution vector of the suspended operation in conditional step 50, the suspended RC machine re-requests the operation it is handling in step 52. A match in conditional step 50 indicates the possibility that a particular hazard has cleared, but does not guarantee that hazard has cleared because the comparison of vectors involves a comparison of only a subset of address bits. For example, the hazard resolution vector broadcast in step 48 may have been from an operation related to a different address, whose subset of address bits happen to match. Additionally, even if a particular hazard has cleared, it is possible for another hazard to have arisen involving the previously suspended RC machine. Therefore, in response to a re-request according to step 52, a hazard check is performed in step 54, wherein the address being handled by the suspended RC machine is compared with the addresses being handled by the other currently active RC machines. If another hazard is detected, the suspended RC machine remains suspended and the subset of address bits are again saved according to step 46. If no hazard is detected involving the RC machine having a cleared hazard resolution vector, then the re-request by the suspended RC machine to go active is granted according to step 56. The application of control logic to set hazard resolution vectors is further discussed below and illustrated in the subsequent figures.

FIGS. 3 through 6 provide an example of managing re-requests in a memory cache using a dependency table 70 over a sequence of instants or clock cycles. The example may be applied to the cached memory system 12 of FIG. 1, such as according to the method generally outlined in FIG. 2. The dependency table 70 assists in visualizing the management of hazards. Although hazard resolution does not require storing such a dependency table 70 in memory, an embodiment of the invention could involve electronically storing such a dependency table, such as to provide a record for troubleshooting or diagnostic purposes.

Figure 3:
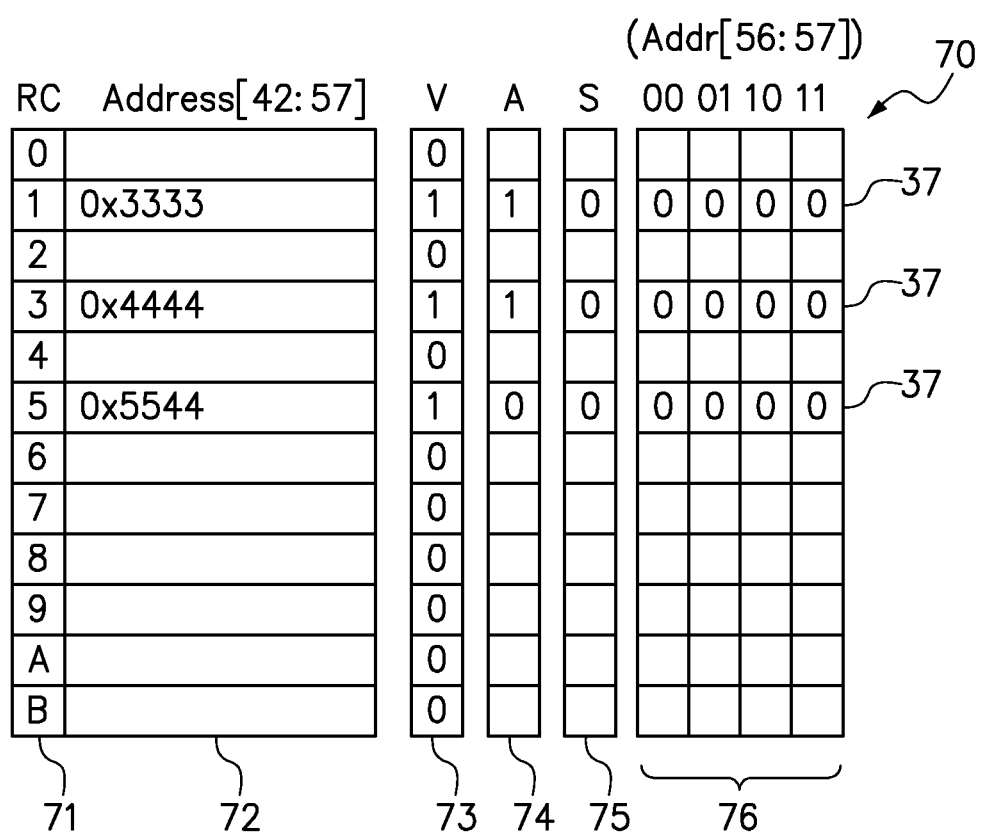
FIG. 3 is a dependency table for tracking detected hazards in a memory cache, at a first instant or clock cycle.

FIG. 3 shows the dependency table 70 at a first instant or clock cycle. The dependency table 70 provides a snapshot of the operations being handled by the memory cache at the given instant or clock cycle. The example assumes twelve RC machines, which are labeled from 0-B in hexadecimal format in a first ("RC") column 71. The example further assumes a 64-bit data width, which may be the width of a memory bus (not shown). Each data bus transaction on a 64-bit bus may therefore be 64-bits or some multiple thereof. The addresses for the operations handled by the RC machines are listed in hexadecimal format, for brevity, in a second, Address column 72. So, for example, the sixteen bit address at bit positions [42:57] of the operation currently being handled by RC-1 is expressed as 0x3333, which is equivalent to 0011001100110011 in binary.

The dependency table 70 further includes three single-bit columns 73-75 indicating the status of the RC machine in each row of the table 70. The three columns are a Valid column 73, Active column 74, and Suspended column 75. A single bit is used in each of columns 73-75 to represent whether each RC machine is currently valid, active, or suspended. Valid means an RC machine holds a dispatched read or write operation. Active means an RC machine's request or re-request was accepted, and that RC machine is actively performing a read or write operation. An RC machine can be valid but inactive if an operation has been dispatched to the RC machine but the RC machine has not yet requested and been granted the request to perform the operation. Suspended means that a request by an RC machine to perform a read or write operation was rejected, typically due to identification of a hazard. In FIG. 3, RC-1 and RC-3 are both valid (bits in column 73 are set to "1") and active (bits in column 74 are set to "1"). RC-5 is currently valid but inactive (bit in column 74 set to "0"). RC-5 is not suspended (bit in column 75 is "0"), despite a hazard between RC-5 and RC-3, because RC-5 has not yet requested to go active to cause the hazard to be detected.

A four-bit, one-hot hazard resolution vector 37 may be selectively encoded for each suspended RC machine using a set of four hazard resolution vector columns 76. Four-bit, one-hot means that each hazard resolution vector 37 includes four bits, and each hazard resolution vector 37, if set will have one and only one bit with a value of "1" and the rest of the bits will be "0." In the instant or clock cycle of FIG. 3, no RC is currently suspended, so the bits in the hazard resolution vector columns 76 are all set to 0. Of the 64 available bits in each line of data or instructions, 16 bits may be address bits, which in this example are in bit positions 42 to 57. These sixteen bits are therefore denoted [42:57]. A subset of bits selected for use in this example are the two bits at bit positions 56 and 57, denoted [56:57]. These last two bits [56:57] are encoded as the four-bit, one-hot vector. Although as many as 2^16 unique addresses may be formed from the 16-bits [42:57], the two digit subset [56:57] can only be one of the four possible combinations: 00, 01, 10, or 11. These four possible combinations are listed, respectively, at the top of the four hazard resolution vector columns 76. In a preferred embodiment, column 76 is generated and used, but is never stored. Because this "dependency" is one hot, the act of clearing and tracking the bits become all zero is not necessary, as the clearing of the bit will always result in releasing the suspended RC to re-request.

For some hazards, the addresses of the operations handled by two RC machines will be the same. For example, a design-type, read-after-write hazard is due to a second RC machine requesting to read an address that is currently being written (or in queue to be written) by a first RC machine. A read-after-write hazard occurs when a second RC machine is tasked with reading the data or instructions at a particular address while a first RC machine is currently writing to that address. The second RC machine will then be suspended. Alternatively, a hazard may occur when even just a portion of the address being handled by two different RC machines is the same. For example, a congruence class hazard exists when the first and second RC machines are handling operations dealing with addresses in the same congruence class. In a 64-bit data string, the congruence class may, for example, be determined by the last eight bits [50:57] of the address. In either case, detecting a hazard involves comparing the address being handled by two RC machines.

No hazard currently exists between RC-1 and RC-3. The two addresses 0x3333 and 0x4444 are different. The two addresses 0x3333 and 0x4444 are also in different congruence classes, as determined by the last eight binary digits of the 16-bit memory address, whose hexadecimal equivalents are 0x33 and 0x44. Because no hazard presently exists between the operations being handled by RC-1 and RC-3, all of the bits in the hazard resolution vector columns 76 are set to "0" for RC-1 and RC-3. Also, since no hazard exists between RC-1 and RC-3, the two RC machines RC-1 and RC-3 are active simultaneously.

However, a congruence class hazard does exist between RC-5 and RC-3. An operation to address 0x5544 has just been dispatched to RC-5 while RC-3 is actively performing an operation to address 0x4444. The two addresses 0x5544 and 0x4444 are in the same congruence class, as determined by the last eight bits 0x44 (bits [50:57] are 01000100). At the instant or clock cycle of FIG. 3, RC-5 has not yet requested to go active, so the hazard has not been detected, and the bits in the hazard resolution vector column 76 for RC-5 are still set to zero.

Figure 4:
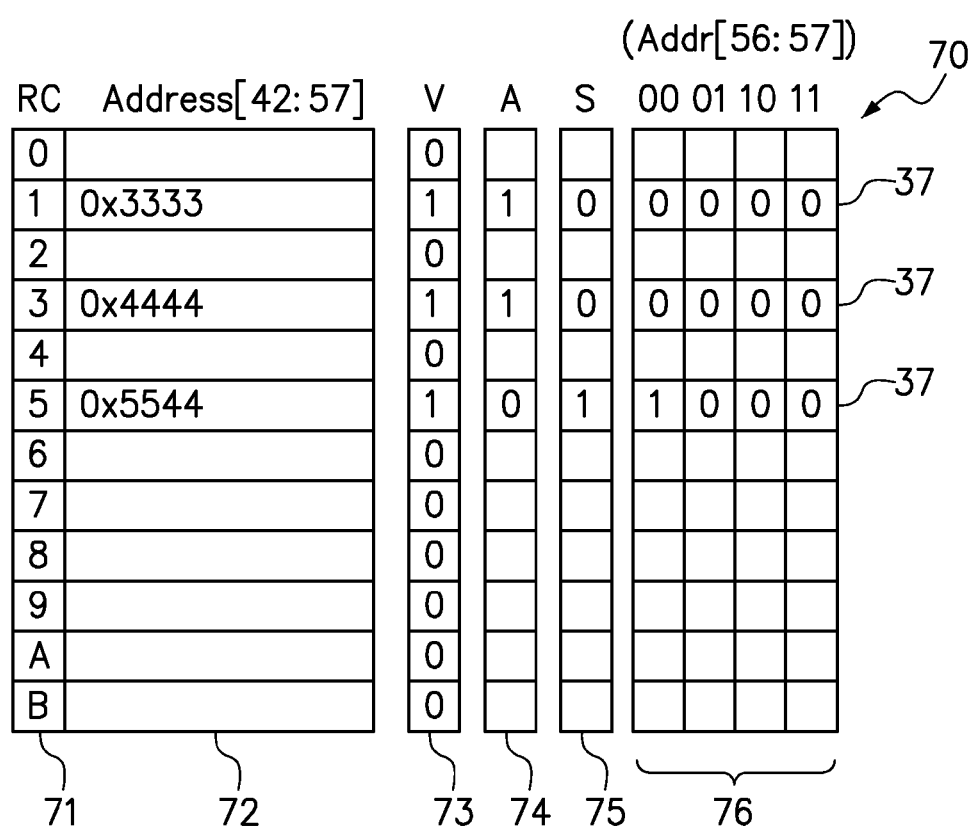
FIG. 4 shows the dependency table at a second instant or clock cycle.

FIG. 4 shows the dependency table 70 at a second instant or clock cycle after RC-5 has requested to go active. As a result of the above-noted congruence-class hazard, a hazard has been detected between RC-3 and RC-5. In response to detecting the hazard, the selected subset of address bits at [56:57] are recorded. The subset of address bits may be recorded in a variety of ways. In this example, the bits [56:57] are efficiently recorded in the dependency table 70 by encoding the two bits [56:57] as the four-bit, one-hot hazard resolution vector 37 using the four hazard resolution vector columns 76. The bits at bit positions [56:57] are "00" for the operations being handled by RC-3 and RC-5, which corresponds to the first "00" column of the hazard resolution vector columns 76. The hazard resolution vector for RC-5 is therefore set to "1000" which is the encoded form of the two bits [56:57]. RC-5 is suspended in response to detection of the hazard, and holds on to the operation at address 0x5544 pending a re-request to go active.

Figure 5:
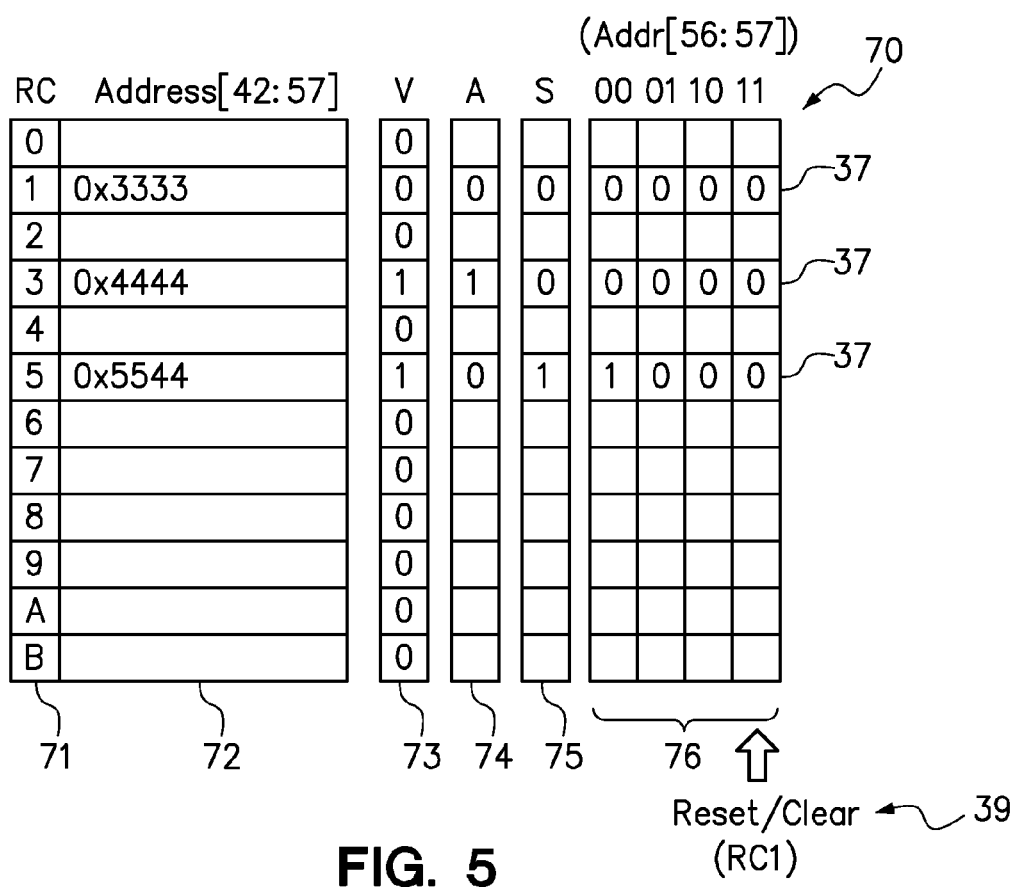
FIG. 5 shows the dependency table at a third instant or clock cycle.

FIG. 5 shows the dependency table 70 at a third instant or clock cycle, where RC-1 has completed its operation at 0x3333 and gone idle. RC-3 remains active with the same operation it was handling in FIG. 3, and RC-5 is still suspended with the operation at memory address 0x5544 still pending. In response to RC-1 having completed its operation and gone idle, RC-1 broadcast its two bits [56:57], which were "11." The broadcast of bits "11" generates a reset signal 39 that clears the fourth of the four hazard resolution vector column 76 (which has "11" at the top). However, all of the bits in the fourth of the four dependency columns 76 were already zero. Because no hazard resolution vectors having non-zero values were reset as a result of this reset/clear signal, no re-request was triggered by any of the twelve RC machines. Thus, RC-3 remains active and RC-5 remains suspended. At this instant or clock cycle, RC-1 is not "valid" as that term is defined previously, because RC-1 is not presently holding a dispatched read or write operation. RC-1 is therefore also not active, because RC-1 is not performing an operation. RC-1 is also not suspended, because RC-1 does not hold an operation that poses a hazard with any other active RC machine.

Figure 6:
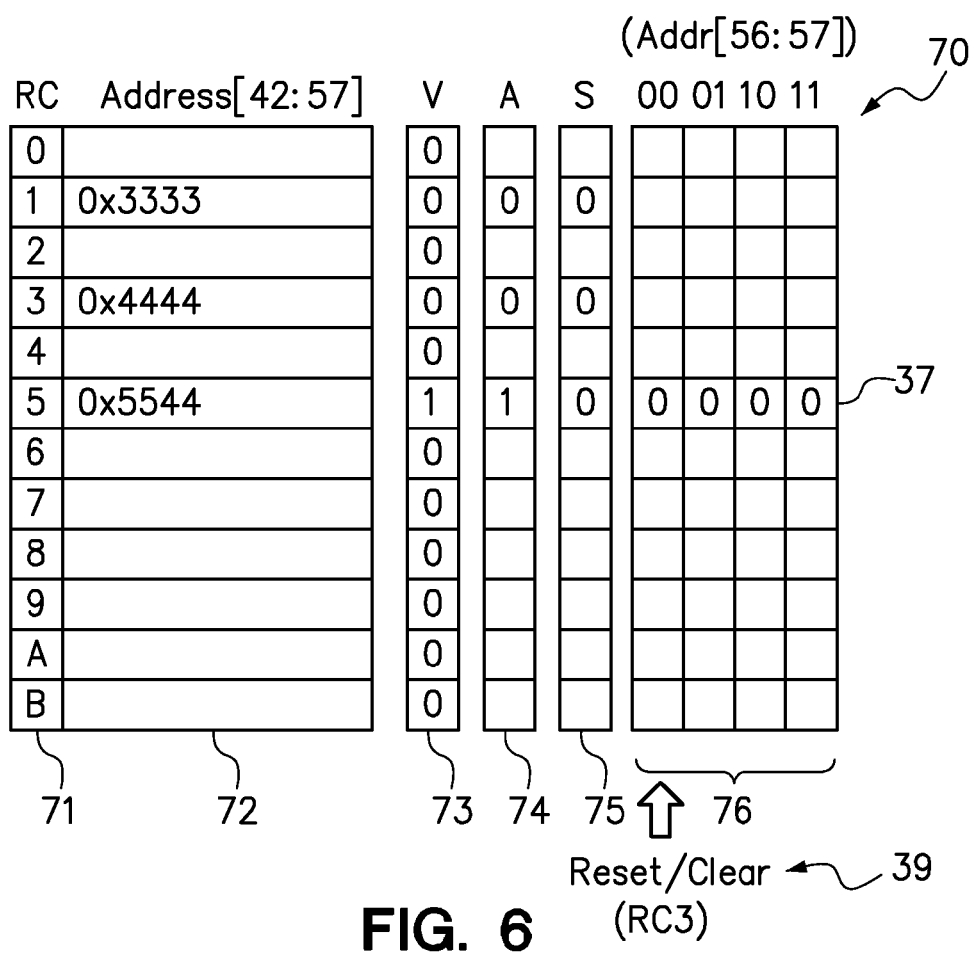
FIG. 6 shows the dependency table at a fourth instant or clock cycle.

FIG. 6 shows the dependency table 70 at a fourth instant or clock cycle, where RC-3 has now completed its operation at 0x4444 and gone idle. In response to RC-3 having completed its operation and gone idle, RC-3 broadcasts its two bits [56:57], which were "00." The broadcast of bits "00" were provided as part of a reset signal 39 that clears the first of the four dependency columns 76 (which has "00" at the top). This signal resets the hazard resolution vector 37 for RC-5 by clearing the "1" in the first hazard resolution vector column 76. In response to clearing the hazard resolution vector 37 for RC-5, RC-5 now re-requests to perform the operation at memory address 0x5544. As with the previous request, when RC-5 re-requests to perform the operation, a hazard check is performed by comparing the address 0x5544 with the address of all other operations performed by active RC machines. However, in this example, RC-1 and RC-3 are not currently active, so no hazard exists. Consequently, RC-5 becomes active (bit in column 74 is set to "1").

Managing the dependency table 70 in the above-described manner avoids certain comparison steps. For example, a direct-compare of the subset of address bits in the dependency table 70 and the subset of address bits broadcast in response to completion of the operation is not needed because the broadcast of the subset of address bits efficiently clears or resets the corresponding hazard resolution vector 70.

The above discussion illustrates hazard resolution using a particular set of address bits. Because the inventive methods may require no additional storage (e.g. the dependency resolution vectors may be generated on-the-fly, rather than stored), there is freedom to change which address bits are used. Therefore, an optional feature is for the subset of address bits used for hazard resolution to be configurable, either by the user in a user-configurable embodiment or by the system in a dynamically-configurable embodiment.

A user configurable embodiment would allow a user to select the address bits. The user may be allowed to select individual address bits, or to choose from among a plurality of predefined subsets of address bits. For example, the user may be allowed to choose any one of four address bit subsets: a) [56:57], b) [55:57], c) [54:56], and d) [54,56:57]. When an RC machine is suspended due to a hazard, that RC machine compares the chosen subset (e.g., subset a, b, c, or d above) for generating the hazard resolution vector to be broadcast when an active RC machine completes its operation(s) and goes idle. The suspended RC machine would then compare the broadcast subset of address bits to its own address bits at the same bit positions.

A dynamically configurable embodiment may have similar hardware and control logic in terms of implementing hazard resolution using a selected subset of address bits, and for optionally providing a choice of different predefined subsets. Additionally, the dynamically configurable implementation may include system control logic to dynamically select the subset of address bits to be used for hazard resolution. In one embodiment, the system would include a prediction feedback control block to determine which is the optimal choice of address bits in a given time frame. The dynamic prediction logic may utilize performance metrics, such as RC machine re-request statistics and power numbers as non-limiting examples.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method, comprising:
   in a memory cache, dynamically dispatching read and write operations;
   detecting a hazard between a requested read or write operation and a read or write operation actively being performed for a specified memory address;
   in response to detecting the hazard, suspending the performance of the requested read or write operation;
   in response to each completed read or write operation, broadcasting a representation of a subset of address bits at specific bit positions of the completed read or write operation; and
   automatically re-requesting any suspended read or write operation for which the subset of address bits equals the broadcast subset of address bits.

2. The method of claim 1, further comprising:
   encoding the subset of the address bits of the completed read or write operation as a first hazard resolution vector;
   encoding the subset of the address bits of the suspended read or write operation as a second hazard resolution vector; and
   comparing the first and second hazard resolution vectors to determine whether the subset of address bits of the suspended operation equals the broadcast subset of address bits.

3. The method of claim 2, further comprising:
   generating the first hazard resolution vector immediately prior to broadcasting the hazard resolution vector, without storing the first hazard resolution vector.

4. The method of claim 2, further comprising:
   storing the hazard resolution vectors in a diagnostic electronic dependency table.

5. The method of claim 1, further comprising:
   setting a suspended bit for a suspended read or write operation;
   clearing the suspended bit for any suspended read or write operation for which the subset of address bits equals the broadcast subset of address bits; and
   automatically re-requesting each suspended read or write operation for which the suspended bit was cleared.

6. The method of claim 1, wherein detecting a hazard between a requested read or write operation and a read or write operation actively being performed for a specified memory address comprises:
   comparing an address of the requested read or write operation with an address of the read or write operation actively being performed.

7. The method of claim 6, further comprising:
   comparing congruence class bits of the requested read or write operation with congruence class bits of the read or write operation actively being performed to detect a congruence class hazard.

8. The method of claim 6, further comprising:
   comparing the full address of the requested read or write operation with the full address of the read or write operation actively being performed to detect a read-after-write hazard.

9. The method of claim 1, further comprising:
   selecting the subset of address bits in response to user input.

10. The method of claim 1, further comprising:
    dynamically selecting the subset of address bits.

11. A computer program product comprising computer usable program code embodied on a non-transitory computer readable storage medium for providing hazard resolution, the computer program product comprising:
    computer usable program code for dynamically dispatching read and write operations in a memory cache;
    computer usable program code for detecting a hazard between a requested read or write operation and a read or write operation actively being performed for a specified memory address;
    computer usable program code for suspending the performance of the requested read or write operation in response to detecting the hazard;
    computer usable program code for broadcasting a representation of a subset of address bits at specific bit positions of the completed read or write operation in response to each completed read or write operation; and computer usable program code for automatically re-requesting any suspended read or write operation for which the subset of address bits equals the broadcast subset of address bits.

12. The computer program product of claim 11, further comprising:
    computer usable program code for encoding the subset of the address bits of the completed read or write operation as a first hazard resolution vector;
    computer usable program code for encoding the subset of the address bits of the suspended read or write operation as a second hazard resolution vector; and
    computer usable program code for comparing the first and second hazard resolution vectors to determine whether the subset of address bits of the suspended operation equals the broadcast subset of address bits.

13. The computer program product of claim 12, further comprising:
    computer usable program code for generating the first hazard resolution vector immediately prior to broadcasting the hazard resolution vector, without storing the first hazard resolution vector.

14. The computer program product of claim 11, further comprising:
    computer usable program code for receiving user input and selecting the subset of address bits in response to the user input.

15. The computer program product of claim 11, further comprising:
    computer usable program code for dynamically selecting the subset of address bits.

16. The computer program product of claim 11, further comprising:
    computer usable program code for setting a suspended bit for a suspended read or write operation;
    computer usable program code for clearing the suspended bit for any suspended read or write operation for which the subset of address bits equals the broadcast subset of address bits; and
    computer usable program code for automatically re-requesting each suspended read or write operation for which the suspended bit was cleared.

17. A cached memory system, comprising:
    a memory cache for dynamically storing data and instructions addressed to main memory, including a plurality of read-claim (RC) machines configured for performing read and write operations originating from a processor;
    control logic for detecting a hazard between a first read or write operation actively being performed by a first RC machine and a second read or write operation being requested by a second RC machine;
    control logic for suspending the second RC machine in response to detection of the hazard;
    control logic for broadcasting a representation of a subset of address bits of the first read or write operation at the specific bit positions in response to completion of the first read or write operation; and
    control logic for automatically re-requesting the second read or write operation in response to detecting the subset of address bits of the second read or write operation equal the broadcast representation of the subset of address bits of the first read or write operation.

18. The cached memory system of claim 17, further comprising:
    control logic for encoding the subset of address bits of the first read or write operation as a hazard resolution vector;
    control logic for encoding the subset of the address bits of the second read or write operation as a second hazard resolution vector; and
    control logic for comparing the hazard resolution vectors to determine whether the subset of address bits of the second read or write operation equal the subset of address bits of the first read or write operation.

19. The cached memory system of claim 18, further comprising:
    control logic for encoding each hazard resolution vector as a multi-bit, one-hot hazard resolution vector.

20. The cached memory system of claim 17, further comprising:
    a plurality of processors, each processor configured for independently dispatching read and write operations to the plurality of RC machines.

* * * * *